Patented Aug. 8, 1933

1,921,497

UNITED STATES PATENT OFFICE 1,921,497

PRODUCTION OF SULPHURIC ANHYDRIDE COMPOUNDS OF PYRIDINE

Ronald Sidney Barnes, John Edmund Guy Harris, and John Thomas, Grangemouth, Scotland, assignors to Scottish Dyes, Limited, Grangemouth, Scotland No Drawing. Application January 16, 1929, Serial No. 333,018, and in Great Britain February 16, 1928

1 Claim. (Cl. 260—42)

This invention relates to improvements in and relating to the production of the sulphuric anhydride compound of pyridine, which compound may be used for making dyestuffs and for other purposes, for instance processes of the type described in the specifications of British Letters Patent Nos. 202,632 and 251,491, in which pyridine sulphur trioxide is employed for the preparation of certain esters.

The principal object of the present invention is to provide an improved or modified process for the manufacture of pyridine sulphur trioxide, whether for use in connection with processes of the type indicated above, or for use for any other purpose.

The invention in brief consists in a process for the production of sulphuric anhydride compounds of tertiary amines (this phrase where used in the specification or claims excluding dimethyl aniline) particularly pyridine sulphur trioxide, according to which an alkali-forming metal pyrosulphate is caused to react at a temperature near the boiling point with the amine, for example, pyridine.

The following examples illustrate how the invention may be carried into effect, all parts being parts by weight:—

Example I

According to this example, potassium pyrosulphate prepared in any suitable way, for example, from the bisulphate, is boiled with pyridine, and the solution filtered whilst hot. From the filtrate, crystals separate on cooling, these being apparently pyridine sulphur trioxide. The residue appears to be potassium sulphate. We have found that the suspension before filtering which still contains the potassium sulphate can be used for esterification, for instance, for the purposes indicated in the specifications of British Letters Patent Nos. 202,632 and 251,491. Alternatively, the pyridine sulphur trioxide may be separated from the inorganic salts by filtration, and then employed for the purpose of making sulphuric acid esters.

Example II

This is a modification of Example I, showing the production and employment of pyridine sulphur trioxide. According to this example, approximately equal parts of finely crushed potassium pyro-sulphate and pyridine are caused to react, preferably by heating them together at or near the boiling point, in an apparatus provided with a reflux condenser. A suitable temperature is 120° C., and a suitable time is fifteen minutes. The resultant mixture is filtered into a dry condensation tube. Starting with about 35 parts of pyridine, the filtrate may be equivalent to about 10 parts of pyridine sulphur trioxide, and 30 parts of pyridine.

Using the filtered solution direct, the air is displaced, for instance, by nitrogen, and 5 parts of leuco thioindigo added. The mixture is then heated at about 60° C. for about fifteen minutes, and the melt poured into an aqueous solution of caustic soda, made for example by mixing 25 parts of caustic soda solution of 20 per cent strength and 300 parts of water. The liquor is then distilled in steam, cooled, aerated, filtered and extracted.

Having now described our invention, what we claim as new and desire to secure by Letters Patent is:—

A process for the production of pyridine sulphur trioxide which consists in heating an alkali-forming metal pyrosulphate and pyridine to a temperature near the boiling point.

RONALD SIDNEY BARNES.
JOHN EDMUND GUY HARRIS.
J. THOMAS.